June 7, 1927.  W. THORNTON  1,631,349
FLEXIBLE WHEEL
Filed May 17, 1926
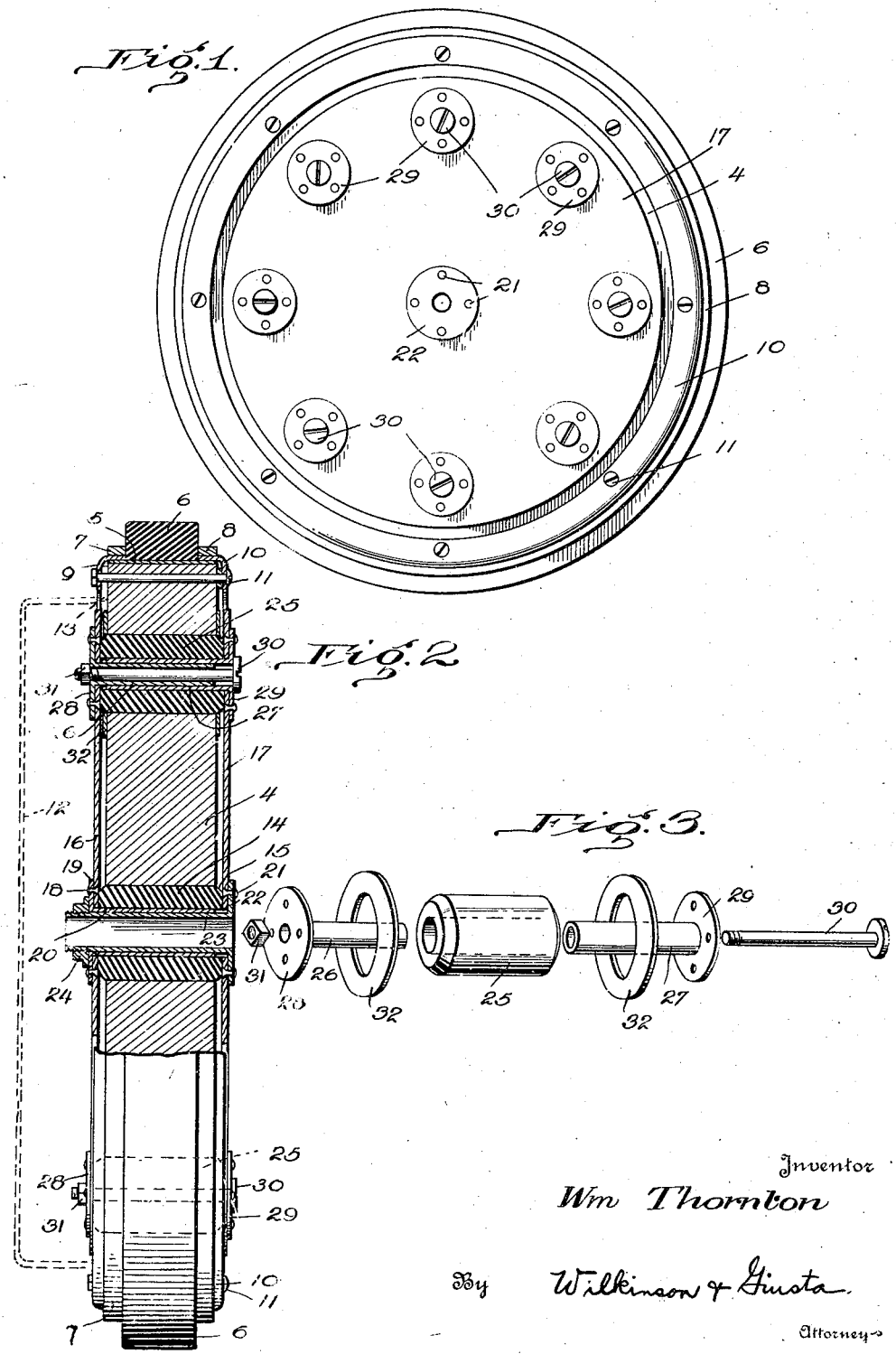
Inventor
Wm Thornton
By Wilkinson & Giusta
Attorneys Patented June 7, 1927.

1,631,349

UNITED STATES PATENT OFFICE.

WILLIAM THORNTON, OF SALT LAKE CITY, UTAH.

FLEXIBLE WHEEL.

Application filed May 17, 1926. Serial No. 109,734.

The present invention relates to improvements in flexible wheels for vehicles, and has for an object to provide an automobile or other vehicle wheel of compact and sturdy construction, but which will nevertheless incorporate a high degree of resiliency capable of adequately absorbing all road shocks.

Another object of the invention is to provide an improved flexible wheel of simple and inexpensive construction in which the shock absorbing elements are protected from the wear incident to travel and from exposure to weather and other detrimental influences, while being accessible for easy adjustment.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of an improved flexible wheel constructed according to the present invention.

Figure 2 is an edge view of the wheel partially in section, and

Figure 3 is a perspective view of one of the flexible elements in detached parts.

Referring more particularly to the drawings, 4 designates the wheel body which may be of wood or other appropriate material. Upon the outer rim of the wheel is the metal or other felly band 5 for receiving the road engaging tire 6, which may be of hard rubber or other appropriate material. At the sides of the tire 6 are rings 7 and 8 which serve to hold the tire in place and prevent its lateral creeping. The rings 7 and 8 are brazed or otherwise secured upon the annular angle iron strips 9 and 10 which envelop the opposite edges of the felly band 5 and extend inwardly at both inner and outer sides of the wheel. Bolts 11 are used to secure the angle strips 9 and 10 together, such bolts passing through the body 4 of the wheel. The felly band 5 protects the circumferential face of the wheel body and acts as a solid, hard-surfaced base for the other component parts of the rim.

The rubber tire 6 may be attached to the felly band 5 or rim as by vulcanizing and the rings or tires 7 and 8 are preferably of steel and sweated on the annular angle strips or flanges 9 and 10. A rim indicated at 12 substantially in the form of a drum with closed outer end and an inner out-turned flange 13 adapted to be seated beneath the angle strip 9 and held by bolts 11, can be used where made necessary by heavy service conditions, such as heavy loads, deep mud, etc. This rim 12 can be faced, if desired, with some suitable non-skid material, such as rubber.

The center of the wheel body 4 is cored out to provide a through passage of suitable diameter in which is located the flexible bushing 14, preferably of rubber. The ends of the bushing project outwardly beyond the side faces of the wheel body and such outer projecting ends are beveled or tapered as indicated at 15.

The wheel body 4 is covered by the inner and outer discs or plates 16 and 17 of metal or other suitable material, such plates being spaced away from the side faces of the wheel body and being placed against the rubber or flexible bushing 14. The plate 16 is secured as by the rivets 18 or other appropriate fastenings to an annular flange 19 projecting outwardly at one end of a sleeve 20, which fits through the central opening of the flexible bushing 14.

The plate 17 is secured as by the rivets 21 to an outwardly extending flange 22 upon one end of a sleeve 23 which telescopes within the companion sleeve 20. The end of the inner sleeve 23 opposite the flange 22 projects beyond the companion sleeve 20 and its flange 19 and is threaded on its projecting part to receive the adjusting nut 24 by the rotation of which the flanges 19 and 22 may be moved together or permitted to spread apart. As these flanges are moved together or permitted to spread apart, of course, the plates or discs 16 and 17 are moved in like manner and this either acts to compress the flexible bushing 14 or permits it to expand and consequently the degree of resiliency offered by the bushing is adjusted at will.

The plates 16 and 17 near their outer peripheries engage against the outwardly projecting tapered ends of an annular series of bushings 25 of rubber or other suitable material mounted through cored out portions of the body of the wheel. In Figure 1 these ancillary bushings are eight in number, although any number may be used and they are grouped circumferentially about the central flexible bushing 14 and upon equal radii. Each ancillary bushing is provided with the telescoping sleeves 26 and 27 having respectively the flanges 28 and 29 riveted, or otherwise secured to the plates or discs 16 and 17 which extend upon the inner sides of these flanges and against the projecting tapered ends of the flexible bushings 25.

Through each set of telescoping sleeves engages a bolt 30 having a projecting threaded end to receive the adjusting nut 31 by which the tension in the bushing bodies can be regulated. Retaining washers 32, composed of a material somewhat harder and less resilient than the flexible bushings are located between the wheel body 4 and the discs 16 and 17. These retaining washers are provided with central apertures through which extend the tapered ends of the bushings 25.

In operation, shocks and jars, incident to road travel are transmitted through the flexible tire 6 and felly band 5 to the wheel body 4 and thence to the various flexible bushings and through these bushings, by means of the metal cage or framework including the discs 16 and 17, to the axle which passes through the sleeve 23. The resiliency of all the bushings is thus taken advantage of in cushioning the shocks passing to the vehicle. The resiliency can be decreased or increased by loosening or tightening the various adjusting nuts 24 and 31 by which the compressive action on the flexible bushings is either diminished or increased. The tapering of the projecting ends of the bushings permits more ready condensing and compressing of these bushings in the wheel body, tending to produce a radial thrust of the flexible material against the surrounding material of the wheel body 4. The retaining washers 32 limit the vertical motion of the projecting ends of the flexible bushings and the steel framework which moves with them, and also limit the extent to which this framework can be forced out of a vertical plane, parallel to the wheel body 4, by eccentric loads due to road shocks on one side or other of the wheel. By removing the adjusting nuts 24 and 31 the disc 16 together with the telescoping bushings 26 and 20 can be readily removed to allow inspection or renewal of flexible bushings 14 and 25 without disturbing the entire wheel. As many bushings as desired may be used and certain or all of these bushings provided with adjusting means.

It is obvious that various changes and modifications may be made in the details of construction and design of the above specifically described embodiment of this invention without departing from the spirit thereof, such changes and modifications being restricted only by the scope of the following claims.

What is claimed is:—

1. A flexible wheel comprising a wheel body, a road engaging tire thereon, a main flexible bushing at the central portion of the wheel, ancillary flexible bushings in the wheel body distributed about said central bushing, and a metal cage adapted to be mounted on the axle and floating in said flexible bushings.

2. A flexible wheel comprising a wheel body, a road engaging tire thereon, a main flexible bushing at the central portion of the wheel, ancillary flexible bushings in the wheel body distributed about said central bushing, and a rigid cage having attachment to both the main and the ancillary bushings and being cushioned by all such bushings combined, said cage adapted to be fitted upon an axle of the vehicle.

3. A flexible wheel comprising a wheel body, a road engaging tire thereon, a main flexible bushing at the central portion of the wheel, ancillary flexible bushings in the wheel body distributed about said central bushing, a metal cage coupled for cushioned movement to all such bushings, and means for adjusting the cushioning effect of said bushings.

4. A flexible wheel comprising a wheel body, a road engaging tire thereon, a main flexible bushing at the central portion of the wheel, ancillary flexible bushings in the wheel body distributed about said central bushing, a metal cage composed of discs fitted upon opposite sides of the wheel body and against opposite ends of said bushings, the ends of said bushings being spaced beyond the sides of the wheel body, and means passing through said bushings and connected rigidly to said discs and adapted to permit the discs to move together against said bushings for compressing the same in said wheel body.

5. A flexible wheel comprising a wheel body, a road engaging tire thereon, a main flexible bushing at the central portion of the wheel, ancillary flexible bushings in the wheel body distributed about said central bushing, a metal cage composed of discs fitted upon opposite sides of the wheel body and against opposite ends of said bushings, the ends of said bushings being spaced beyond the sides of the wheel body, means passing through said bushings and connected rigidly to said discs and adapted to permit the discs to move together against said bushings for compressing the same in said wheel body, and means for drawing said discs together against the projecting ends of said bushings.

6. A flexible wheel comprising a wheel body, a road engaging tire thereon, a main flexible bushing at the central portion of the wheel, ancillary flexible bushings in the wheel body distributed about said central bushing, said bushings having tapered ends projecting beyond the sides of the wheel body, discs fitted against said tapered projecting ends, telescoping sleeves passing through the flexible bushings and secured to opposite discs, and means associated with said telescoping sleeves for drawing the sleeves and discs together upon the flexible bushings.

7. A flexible wheel comprising a wheel body, a felly protecting band encircling the wheel body, a flexible tire narrower than the wheel body and band secured on said band, annular angle strips embracing the sides of said band, engaging against the tire and having portions extending about the side faces of the wheel body adjacent its outer periphery, means to secure said latter portions to the wheel body, and rings secured on said annular angle strips and fitting against the sides of said tire.

WILLIAM THORNTON.